United States Patent
Gupta et al.

(10) Patent No.: US 10,298,461 B2
(45) Date of Patent: May 21, 2019

(54) SYSTEM AND METHOD FOR DETERMINING A MASTER DEVICE IN A NEIGHBORHOOD AWARE NETWORK

(71) Applicant: Motorola Mobility LLC, Chicago, IL (US)

(72) Inventors: Ranjeet Gupta, Chicago, IL (US); Gabriel Burca, Palatine, IL (US); Binesh Balasingh, Naperville, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 154 days.

(21) Appl. No.: 15/150,462

(22) Filed: May 10, 2016

(65) Prior Publication Data
US 2017/0331696 A1 Nov. 16, 2017

(51) Int. Cl.
*G06F 15/173* (2006.01)
*H04L 12/24* (2006.01)
*H04L 12/26* (2006.01)
*H04L 29/08* (2006.01)
*H04W 4/02* (2018.01)
*H04W 84/20* (2009.01)
(Continued)

(52) U.S. Cl.
CPC .............. *H04L 41/12* (2013.01); *H04L 43/08* (2013.01); *H04L 43/0864* (2013.01); *H04L 67/104* (2013.01); *H04L 67/1044* (2013.01); *H04W 4/023* (2013.01); *H04W 4/80* (2018.02); *H04W 76/14* (2018.02); *H04W 84/20* (2013.01)

(58) Field of Classification Search
CPC ........ H04L 41/12; H04L 43/08; H04L 67/104
USPC .......................................................... 709/224
See application file for complete search history.

(56) References Cited

U.S. PATENT DOCUMENTS 10,149,232 B2 * 12/2018 Kim ...................... H04W 48/16
2005/0014467 A1 * 1/2005 Ishiwata ............... H04W 84/20
455/39
(Continued)

OTHER PUBLICATIONS

Junpei Anno, L. Barolli, A. Durresi, Fatos Xhafa and Akio Koyama, "A cluster head decision system for sensor networks using fuzzy logic and number of neighbor nodes," 2008 First IEEE International Conference on Ubi-Media Computing, Lanzhou, 2008, pp. 50-56. (Year: 2008).*

(Continued)

*Primary Examiner* — Taylor A Elfervig
(74) *Attorney, Agent, or Firm* — Yudell Isidore PLLC

(57) ABSTRACT

A device and method for determining a master device in a neighborhood aware network (NAN). The method includes identifying a number of peer devices located within communication range of a first device and that are capable of communicating via the NAN. A master rank value associated with a corresponding peer device is retrieved from each received response. A first master rank value is calculated for the first device, at least partially based on the number of responding peer devices. The first master rank value is compared with the received master rank values of the responding peer devices. In response to the first master rank value being greater than each of the received master rank values, the first device assumes a role of a master device within a NAN cluster that includes the first device and the responding peer devices.

20 Claims, 10 Drawing Sheets

(51) Int. Cl.
   *H04W 4/80*      (2018.01)
   *H04W 76/14*     (2018.01)

(56) References Cited

U.S. PATENT DOCUMENTS

| | | | | |
|---|---|---|---|---|
| 2008/0056131 | A1* | 3/2008 | Balakrishnan | H04L 41/142 |
| | | | | 370/232 |
| 2013/0132500 | A1* | 5/2013 | Vandwalle | H04L 67/104 |
| | | | | 709/208 |
| 2013/0185373 | A1* | 7/2013 | Vandwalle | H04W 56/0015 |
| | | | | 709/208 |
| 2014/0187257 | A1* | 7/2014 | Emadzadeh | G01S 5/0242 |
| | | | | 455/456.1 |
| 2015/0006633 | A1* | 1/2015 | Vandwalle | H04L 67/1051 |
| | | | | 709/204 |
| 2016/0150465 | A1* | 5/2016 | Jung | H04W 48/16 |
| | | | | 370/254 |
| 2016/0212616 | A1* | 7/2016 | Allen | H04W 12/04 |
| 2016/0278086 | A1* | 9/2016 | Du | H04W 56/0015 |
| 2017/0006562 | A1* | 1/2017 | Kim | H04W 48/12 |

OTHER PUBLICATIONS

D. Camps-Mur, E. Garcia-Villegas, E. Lopez-Aguilera, P. Loureiro, P. Lambert and A. Raissinia, "Enabling always on service discovery: Wifi neighbor awareness networking," in IEEE Wireless Communications, vol. 22, No. 2, pp. 118-125, Apr. 2015. (Year: 2015).*

* cited by examiner

SYSTEM AND METHOD FOR DETERMINING A MASTER DEVICE IN A NEIGHBORHOOD AWARE NETWORK

BACKGROUND

1. Technical Field

The present disclosure generally relates to electronic devices. More specifically, the present disclosure relates to a system and method for determining a master device in a neighborhood aware network.

2. Description of the Related Art

Mobile electronic devices such as laptops and mobile phones are extremely popular and enjoy wide spread acceptance and use in our society. Many of these electronic devices include wireless networking capabilities. In particular, many devices include wireless fidelity (Wi-Fi) capabilities. To enable and/or support ad-hoc device networking, the Wi-Fi Alliance has developed a protocol referred to as Neighbor Aware Networking (NAN). NAN facilitates device-to-device service discovery among various Wi-Fi enabled devices. NAN allows multiple Wi-Fi devices to be synchronized with each other. Specifically, the devices can form a cluster of devices that wake up at the same time period (referred to as the discovery window) and communicate with each other during the discovery window.

BRIEF DESCRIPTION OF THE DRAWINGS

The description of the illustrative embodiments is to be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
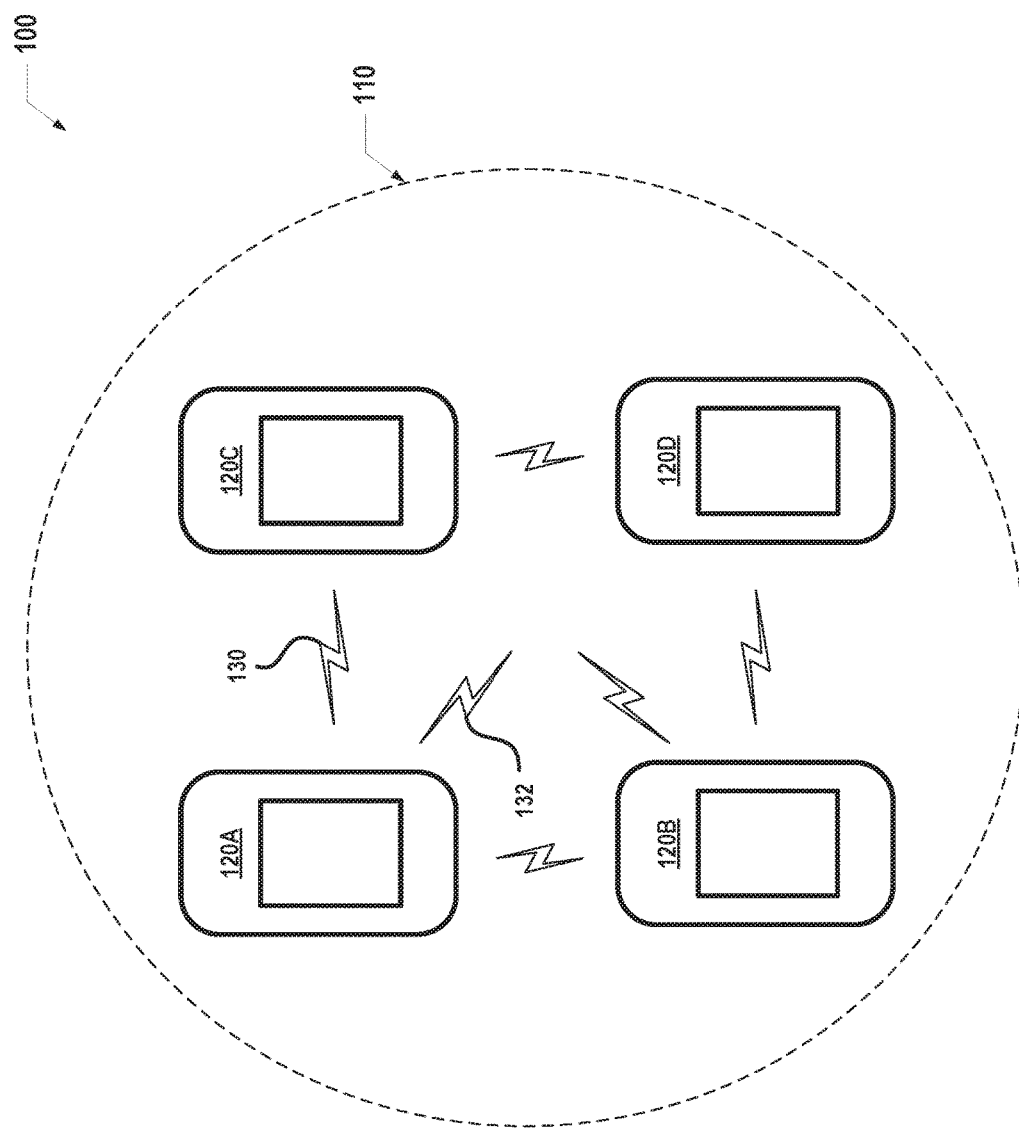
FIG. 1 illustrates a diagrammatic representation of an example neighborhood aware network (NAN) system, according to one embodiment.

The illustrative embodiments provide a device and method for electing a master device in a neighborhood aware network (NAN) environment. The method includes identifying, at a first device, a number of peer devices located within a first communication range of the first device and that are capable of communicating with the first device via a neighborhood aware network (NAN). A relative distance of a corresponding peer device to the first device is identified based on response characteristics associated with a service discovery frame (SDF) response received from each of the peer devices. A master rank value associated with a corresponding peer device that issued the SDF response is retrieved from each SDF response. A first master rank value is calculated for the first device, at least partially based on the number of responding peer devices. The first master rank value is compared with the received master rank values of the responding peer devices. In response to the first master rank value being greater than each of the received master rank values, the first device becomes (i.e., is identified as or assumes the role of) a master device within a NAN cluster that comprises the first device and the responding peer devices.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments. In the illustration of the various embodiments, two different figures can be provided that have overlaps and/or similarities in the components within the two figures. In such instances, the descriptions of these figures can be presented together to avoid repetition. Components that are not intended to be different from one illustration to the other are provided the same reference numerals within the figures, to simplify the descriptions of the figures. In the description of each of the following figures, reference is also made to elements described in one or more preceding figures.

The below described figures present aspects of a NAN system 100. Those of ordinary skill in the art will appreciate that the hardware components and basic configuration depicted in FIGS. 1-10 may vary. The illustrative components are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure. As a general extension of the disclosure, the aspects described herein as being implemented within or involving an electronic device, illustrated as a mobile phone, are understood to be only a specific example or representation of an electronic device. The described functionality is particularly applicable to a computer system, including a desktop, laptop, tablet, or other type of computing device.

With reference now to the figures, and beginning with FIG. 1, there is depicted a neighborhood aware network (NAN) system 100 within which a method for determining a master device in the NAN can be advantageously implemented. NAN system 100 comprises an example NAN cluster 110 including several electronic devices 120A-D that can wirelessly communicate wireless signals 130 via a wireless network using a wireless communication protocol. Electronic devices 120A-D can be non-mobile devices that have a fixed location or can be mobile devices that have a variable location. Examples of non-mobile electronic devices can be desktop computers, servers, base stations and other fixed electronic devices. For purposes of the description of illustrative embodiments, electronic devices 120A-D are illustrated and described as electronic devices or mobile devices 120A-D. Devices 120A-D can be one of a wide variety of digital/electronic devices that can communicate via wireless transmission over a wireless network, including devices such as a mobile phone, smartphone, personal digital assistant, tablet computer or other digital device.

In one embodiment, the devices 120A-D can belong to NAN cluster 110. And, the devices can be configured to communicate over an established wireless network (or NAN) according to one or more wireless communication protocols. Within NAN cluster 110, any of the devices 120A-D can be designated as the master NAN device based on a selection criteria and methodology described herein, and at least one of devices 120A-D can be designated a master NAN device. The designated master NAN device (also referred to herein as the master NAN device) then takes over the tasks of (or becomes responsible for) sending beacons to keep all the other devices synchronized and to allow new devices to find and join the cluster 110. For example, the master NAN device repeatedly (e.g., for example every 100 ms) broadcasts a discovery beacon 132. Another device can then receive the discovery beacon by performing a scan to detect and join the cluster.

Figure 2:
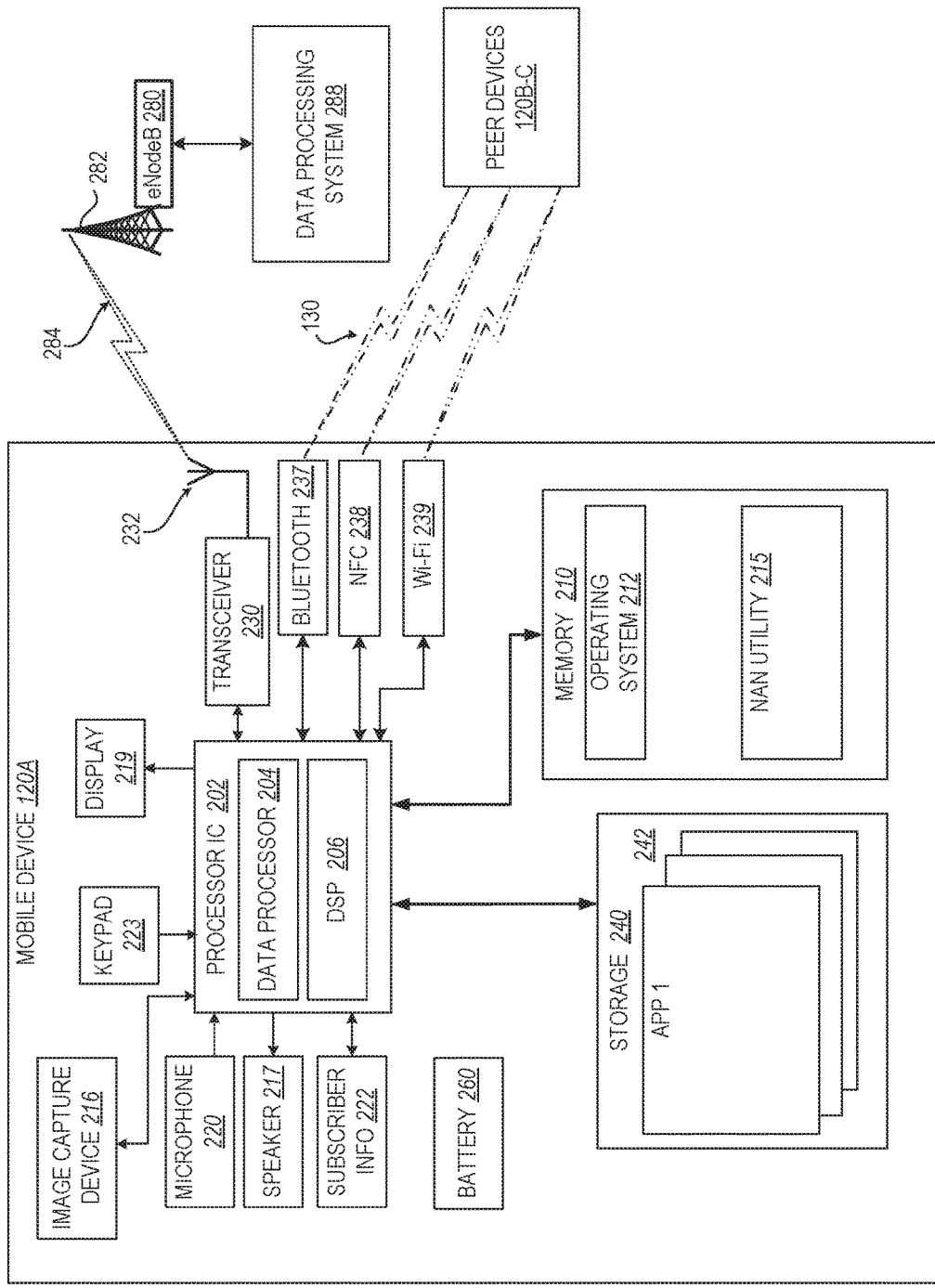
FIG. 2 illustrates a block diagram representation of an example electronic device with wireless connections to external networks and devices, according to one embodiment.

FIG. 2 illustrates an example device 120A with Wi-Fi capability that enables device 120A to establish wireless connections with other devices (e.g., peer devices 120B-D) and wirelessly communicate with those other devices. Device 120A includes processor integrated circuit (IC) 202 that has data processor 204 and digital signal processor 206. Processor IC 202 is in communication with memory 210 and storage 240 via a communication bus or direct connection. Memory 210 is a non-transitory computer readable storage medium/device that stores data and software programs and code that can be executed on processor IC 202. In one embodiment, memory 210 is a non-volatile memory. Memory 210 can contain operating system 212 and NAN utility 215.

Operating system 212 manages the hardware resources of device 120A and provides common services for software applications. NAN utility 215 executes on processor IC 202 to manage communications between device 120A and other devices within cluster 110 and to perform various functional processes described herein.

Storage 240 is a computer readable storage medium/device that stores data and software programs and code that can be executed on processor IC 202. In one embodiment, storage 240 is a non-volatile memory. Storage 240 includes one or more software applications (APP) 242, an example of which is shown as APP 1. Software applications 242 execute on data processor 204 of processor IC 202 to perform various functional processes.

Device 120A further comprises image capture device 216, microphone 220, speaker 217, keypad 223, and display 219, all of which are connected to processor IC 202. Device 120A accepts user input using microphone 220, keypad 223, and display 219 when the display is a touch screen. Device 120A provides audio output to a user via speaker 217 and visual output via display 219. Subscriber information module (SIM) 222 is communicatively coupled to processor IC 202. SIM 222 can be a removable memory module that contains encrypted access data that allows device 120A to access a wireless network via an evolved node B (eNodeB) 280 of a wireless infrastructure network. Device 100 also has a Bluetooth transceiver 237, near field communication transceiver (NFC) 238, and a Wi-Fi transceiver 239. Bluetooth transceiver 237, NFC transceiver 238, and Wi-Fi transceiver 239 are in communication with processor IC 202. Bluetooth transceiver 237, NFC transceiver 238, and Wi-Fi transceiver 239 allow device 120A to communicate with similarly equipped devices, such as peer devices 120B-D via wireless signals 130, in close proximity or over a short range.

Device 120A further includes transceiver 230 that is communicatively coupled to processor IC 202 and to antenna 232. Transceiver 230 allows for wide-area or local wireless communication between device 120A and evolved node B (eNodeB) 280 via a wireless signal 284. Device 120A can be communicatively coupled to and in communication with data processing system (DPS) 288 via a communication path involving transceiver 230, antenna 232, wireless signal 284 and eNodeB 280. Device 120A is capable of wide-area or local wireless communication with other wireless devices or with eNodeB 280 as a part of a wireless communication network. DPS 288 can transmit data and software to device 120A and receive data transmitted from device 120A and other devices connected to the wireless network. Device 120A also contains a power source such as a battery 260 that supplies power to device 120A.

Figure 3:
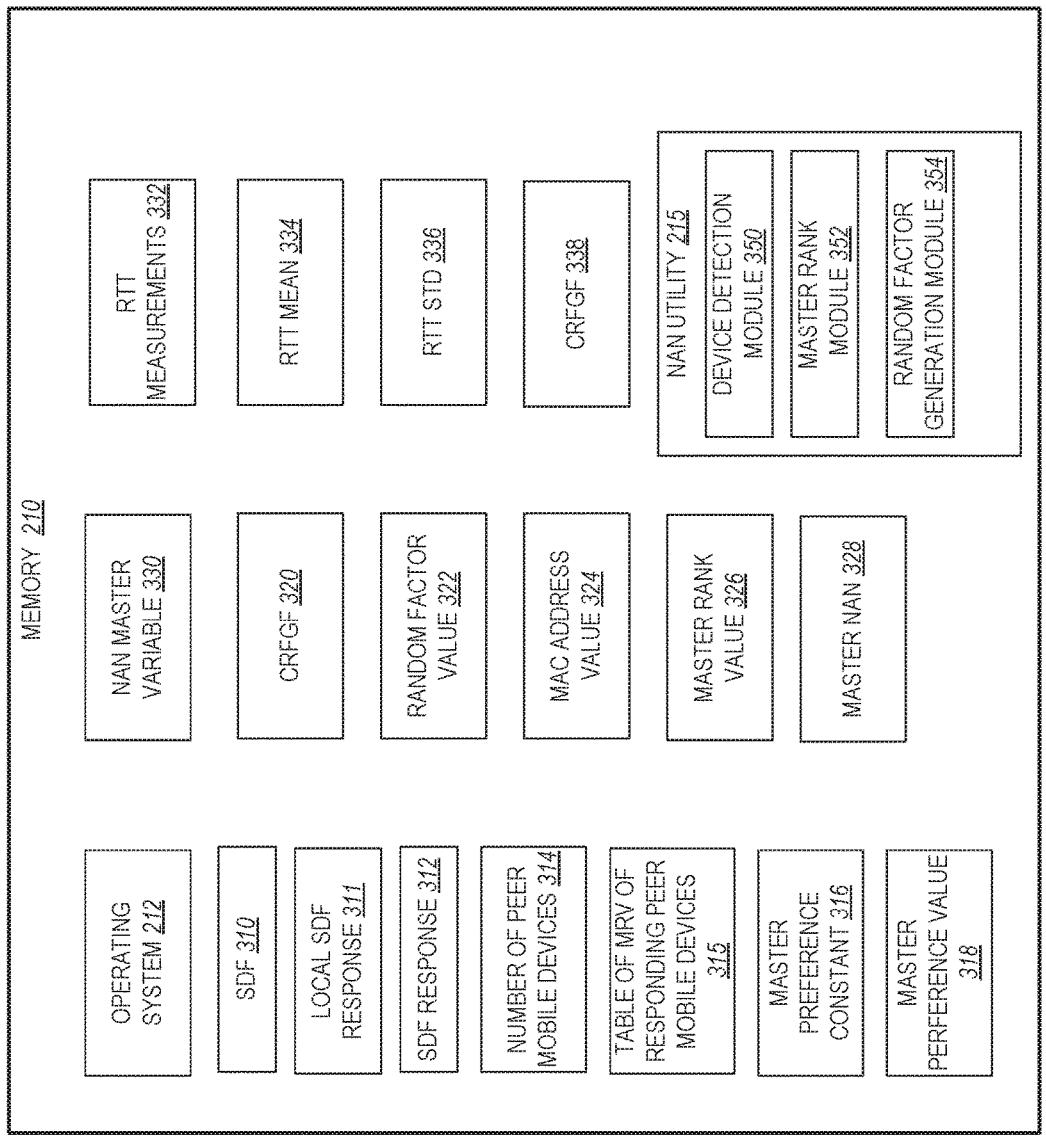
FIG. 3 is a block diagram illustrating contents of an example device memory, according to one embodiment.

FIG. 3 illustrates further details of example contents of memory 210 within device 120A and potentially within other similar devices (e.g., 120B-D). Memory 210 contains operating system 212 and NAN utility 215. Operating system 212 manages the hardware resources of device 120A and provides common services for software applications. Memory 210 further includes a service discovery frame (SDF) 310 and local SDF response 311. SDF 310 is transmitted by device 120A to other peer devices 120B-D to enable the discovery of other services that may be provided or supported, by one or more of the peer devices 120B-D. Local SDF response 311 is the response generated by device 120A to transmit in response to receipt of an SDF 310 from another device. Memory 210 also includes received SDF responses 312, which are received from the peer devices 120B-D in response to transmission (or broadcast) of SDF 310 by device 120A. Received SDF responses 312 can contain various parameters and characteristics of the peer devices 120B-D and their supported services. In one embodiment, received SDF responses 312 can be utilized to determine the number of responding peer devices 314. Each received SDF response 312 can include the master rank values (MRV) of the responding peer device. Memory 210 also includes a table 315 containing the MRV of each responding peer device. Table 315 is locally generated based on the information contained within received SDF responses 312. In one embodiment, table 315 can also include the calculated MRV (326) of device 120A, once that MRV value has been calculated. Table 315 can also include an indication of which device, if any, is the current master NAN device 328.

Memory 210 further stores a master preference constant 316, a master preference value 318, a NAN master variable 330, a configurable random factor generating function (CRFGF) 320, a random factor value 322, a media access control (MAC) address value 324, and calculated master rank value 326. The derivation of master rank value 326 is based on a calculation performed by device 120A, and the resulting value is assigned to device 120A and utilized to determine which of the devices (from among device 120A and any responding peer device having a received MRV within table 315) will serve as the master NAN device. The master rank value 326 is calculated at least partially based on one or more of master preference constant 316, master preference value 318, NAN master variable 330, random factor value 322, and MAC address value 324.

According to one aspect of the disclosure, the NAN specification provides a fixed set of bits/bytes to reference the master rank. From among the master rank bytes, the most significant bit of the most significant byte (which is also known as the master preference value) can be fixed to indicate whether the device wants to (1) or does not want to (0) serve as a master NAN device. The remaining least significant bits of the most significant byte can be left up to the device to populate with a value that indicates how strongly the device wants to serve as a NAN master device. The disclosure involves setting these 7 remaining least significant bits to a value representing the number of visible peer devices. Devices that are centrally located will then be able to "see" and interface with more peers, as identified by the value of these 7 remaining bits. According to one aspect, the device (or devices) having the higher number of recorded visible peer devices is deemed more suitable to be a NAN master device. The calculation of master rank value 326 will be described later in further detail.

Memory 210 also includes signal quality measurements such as round trip time (RTT) measurements 332, derived or determined, in one embodiment, from time values associated with received SDF responses 312. In one embodiment, device 120A measures the RTT for a wireless signal to travel from device 120A to each of the peer devices 120B-D and return and save these time values as RTT measurements 332. RTT measurements 332 are proportional to the respective distance between device 120A and each of the peer devices 120B-D. Memory 210 also includes values calculated from the measured RTTs, including RTT mean 334, RTT standard deviation (STD) 336, and a configurable random number generator (CRFGF) 338. RTT mean 334 is the mean of the RTT measurements, and RTT STD 336 is the standard deviation of the RTT measurements. CRFGF 338 is configured based on RTT mean 334 and RTT STD 336. In one embodiment, random factor value 322 can be selected from CRFGF 338. In other embodiments, signal quality measurements, that can include signal strength or link quality, can be used to configure CRFGF 338.

NAN utility 215 executes on data processor 204 (in combination with signal processing performed by DSP 206) to manage communications between device 120A and peer devices within cluster 110 and to perform various functional processes. NAN utility 215 includes device detection module 350, master rank module 352 and random factor generation module 354. Device detection module 350 is responsible for transmitting SDF 310 and receiving received SDF responses 312 from peer devices. Master rank module 352 calculates the master rank value 326 for device 120A. Random factor generation module 354 uses CRFGF 338 to calculate master rank value 326.

According to one aspect, device 120A, via data processor 204, can identify a number of peer devices 120B-D that are located within a first communication range of device 120A and are capable of communicating with the first device via NAN 110. According to one aspect, the relative distance of corresponding peer device 120B-D to device 120A is identified based on response characteristics associated with received SDF response 312 received from each of the peer devices. NAN cluster 110, for which election of a master NAN device is performed, is identified by each communicating device (120A-D) as containing device 120A and the responding peer devices 120B-D. MRV 315 associated with the peer device that issued the SDF response 312 is retrieved from each SDF response. According to one embodiment, calculated MRV 326 for device 120A is calculated at least partially based on the number of responding peer devices 314, and the calculated MRV 326 is compared with the received MRVs 315 of the responding peer devices. In response to the calculated MRV 326 being greater than each of the received MRVs 315, device 120A becomes (i.e., is identified as or assumes the role of) the master NAN device 328 within NAN cluster 110.

Figure 4:
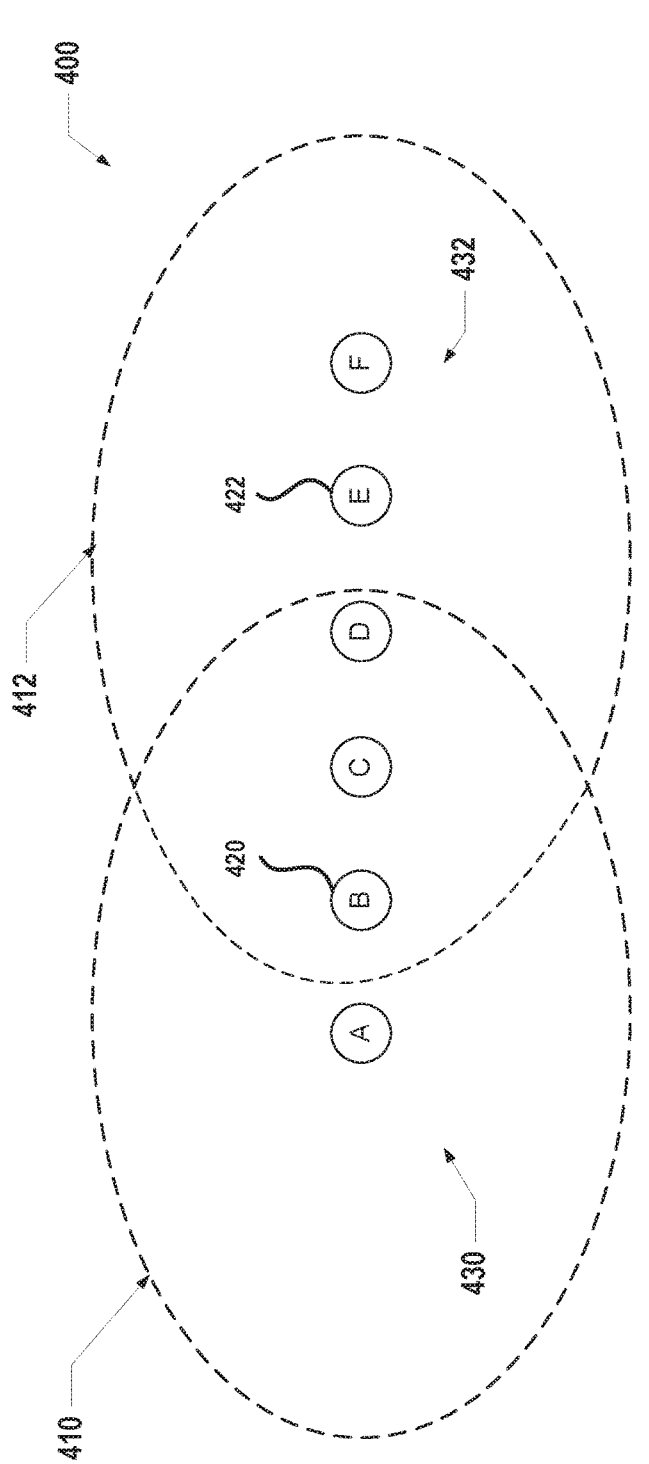
FIG. 4 illustrates a diagrammatic representation of an example NAN system with several peer groups of devices, according to one embodiment.

FIG. 4 illustrates another example of NAN cluster 400, which includes a first peer group 410 and a second peer group 412, collectively presenting devices A-F. Within NAN cluster 400, two devices, first device 420 (device B) and second device 422 (device D) are contesting to be the master NAN device (for the entire cluster) within the peer groups. For the presented embodiment, an assumption is made that each device can only "see" (i.e. communicate with other devices) 3 units away. Thus, first device 420 can see devices A, C, D, E (i.e., 4 total devices), and second device 422 can see devices A, B, C, E, F (i.e., 5 total devices). For first device 420, the number of peer devices 430 that are within the communication range of first device 420 and that can respond or have responded to an SDF generated from/by first device 420 is four. For second device 422, the number of peer devices 432 within the communication range of second device 422 and that can respond or have responded to an SDF generated from/by second device 422 is five.

Each of the devices within NAN cluster 400 maintains a master rank value, which represents each device's suitability to operate as a master NAN device. The master rank value 326 is calculated based on three components, the master preference value 318, the random factor value 322 and the MAC address value 324.

According to one embodiment, the master rank value 326 is calculated by equation (1):

Master Rank value=Master Preference value*2^56+
Random Factor value*2^48+MAC value[5]
*2^40+ . . . +MAC value[0]     (1)

The master rank value can be calculated based on a master preference constant 316 added to (+) a master preference value 318, a random factor value 322, and a MAC address value 324. Because the master preference value is multiplied by a larger number (i.e. 2^56 in equation (1)), the master preference value is the dominant term in equation (1). In an embodiment, the master preference constant can be 128 and the master preference value 318 is set equal to the sum of the master preference constant 316 and the count of the number of peer devices 430 that are within the communication range of device 420 and have responded to the generated SDF. For first device 420, the master preference value is four and for second device 422, the master preference value is five. Using the above equation and current values, the master rank value for device 420 can be calculated by equation (2):

Master Rank value=(128+4)*2^56+Random Factor
value*2^48+MAC value[5]*2^40+ . . . +MAC
value[0]     (2)

The master rank value for device 422 is then calculated by equation (3):

Master Rank value=(128+5)*2^56+Random Factor
value*2^48+MAC value[5]*2^40+ . . . +MAC
value[0]     (3)

A higher numerical value of the master preference value results in a higher master rank value and indicates that device's higher preference to be a master NAN device. As shown in FIG. 4, because the master preference value (i.e. count of responding peer devices) for second device 422 is higher than the master preference value for first device 420, second device 422 will have the highest master rank value, regardless of the random factor value or the MAC address value.

Figure 5:
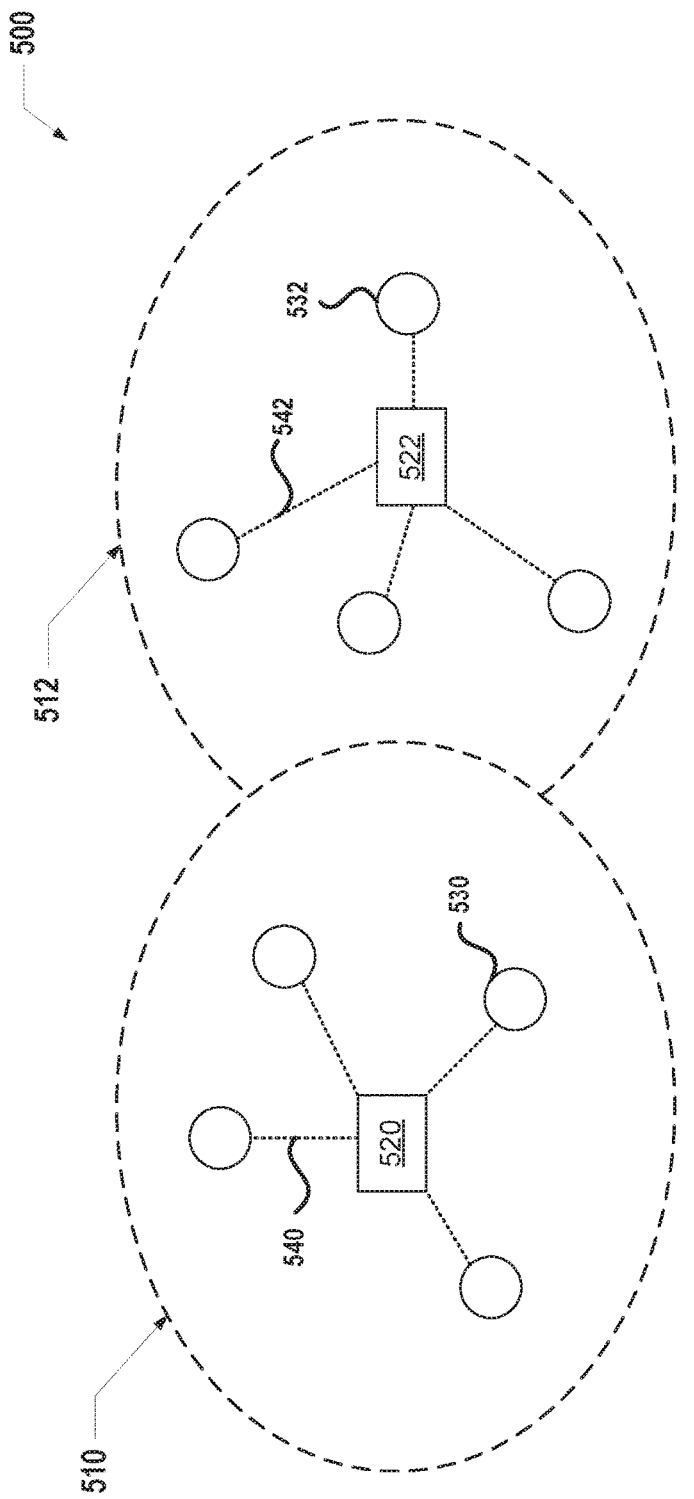
FIG. 5 illustrates a diagrammatic representation of an example NAN system showing peer groups of devices separated by various distances, according to one embodiment.

FIG. 5 illustrates a NAN cluster 500 including a first peer group 510 and a second peer group 512. Two devices, first device 520 and second device 522 are contesting to be the NAN master device within the peer groups. First device 520 is separated from each of the peer devices 530 by a first distance 540. First device 520 can measure signal quality measurements such as RTT measurements 322 by using the time taken for a wireless signal to travel between device 520 and each of peer devices 530. In other embodiments, the signal quality measurements can include measurements based on signal strength or link quality. The RTT measurements 322 are used to calculate distances 540. Similarly, second device 522 is separated from each of the peer devices 532 by a second distance 542.

In FIG. 5, devices 520 and 522 have the same number of peer devices (four) within communication range, which would result in the master preference value 318 being the same for both devices. In this scenario and according to one aspect of the disclosure, the random factor value 322 can be selected from a normal random distribution with the mean set to the device's round trip time (RTT) mean 334 to the peer devices and the standard deviation (STD) set to the device's RTT STD 336 to the peer devices. Each RTT is proportional to the distance between the device and a peer device. The mean of the normal distribution mean is proportional to (255−RTTmean), and the variance is proportional to the RTT STD. The RTTmean for device 520 can be calculated by equation (4):

RTTmean=(RTT1+RTT2+RTT3+RTT4)/4     (4)

Figure 6:
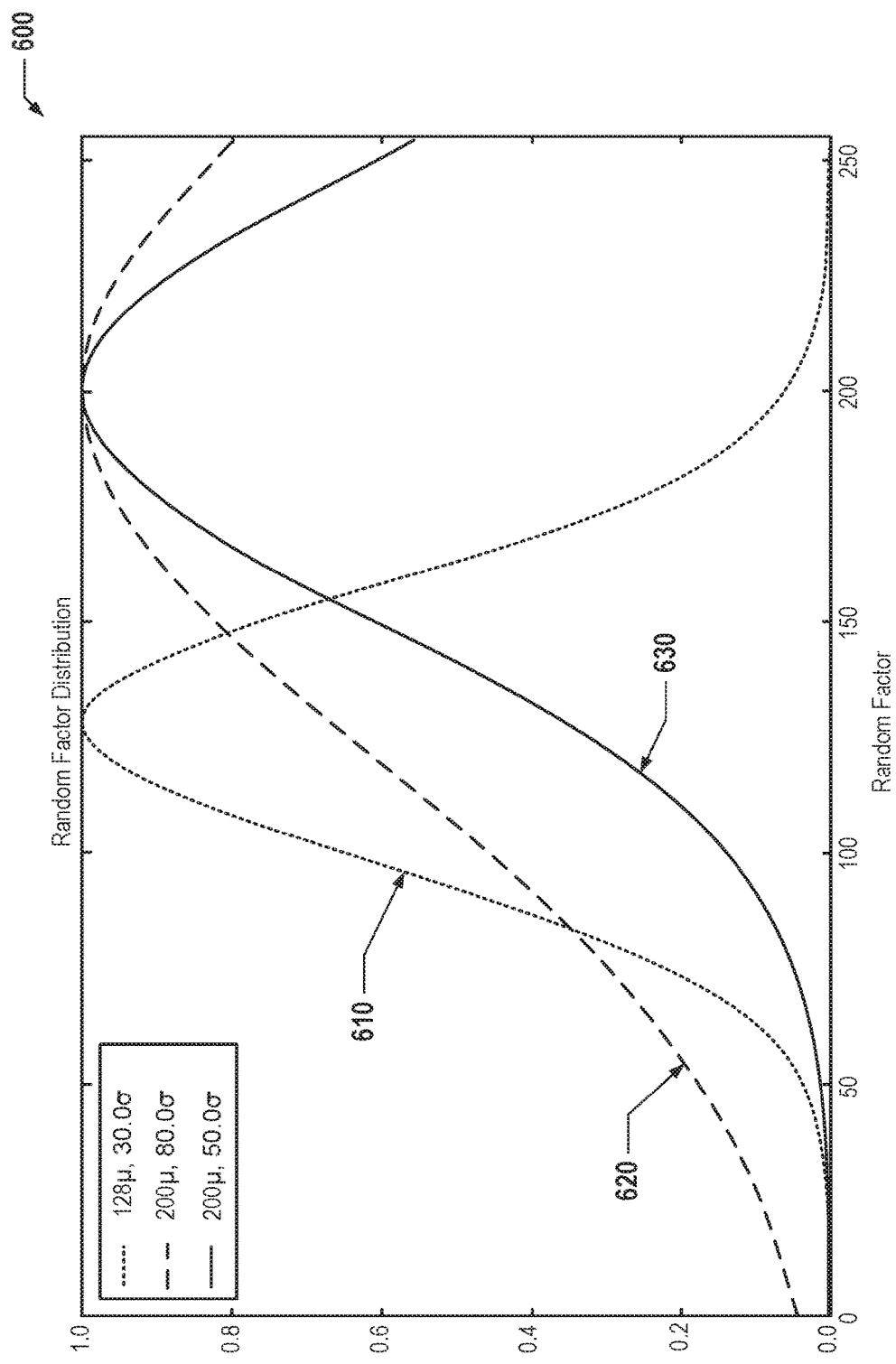
FIG. 6 illustrates a graph of three normal distributions each having different means and standard deviations, according to one embodiment.

FIG. 6 illustrates a graph 600 of three normal distributions 610, 620 and 630 each having different means and standard deviations. In FIG. 6, the X-axis represents random factor values in the interval from 0 to 255 and the Y-axis represents the relative probability of the random factor value occurring or being selected. The PDF of a normal distribution is given by equation (5):

$$f(x\mid \mu, \sigma) = \frac{1}{\sqrt{2\pi\sigma^2}} e^{\frac{(x-\mu)^2}{2\sigma^2}} \quad (5)$$

In equation (5), μ represents the mean and σ represents the standard deviation (STD). In FIG. 6, first normal distribution 610 has a mean of 128 and a STD of 30, second normal distribution 620 has a mean of 200 and a STD of 80 and third normal distribution 630 has a mean of 200 and a STD of 50. A device with a short RTT to all of its peer devices corresponds to probability distribution 630. The random factor for the device with a short RTT would be drawn from probability distribution 630. Another device with the same mean RTT to its peers, but with a larger standard deviation, will draw its random factor from the corresponding probability distribution 620. Yet another device which is on average farther away from its peer devices will draw its random factor from the corresponding probability distribution 610. The device that is more suitable to become a master NAN master device will select a random factor that is statistically larger than a device that is not as suitable to become a master NAN device. As shown in FIG. 6, the device associated with probability distribution 630 is on average closer to its peer devices and is more suitable to become a master NAN device.

Figure 7A:
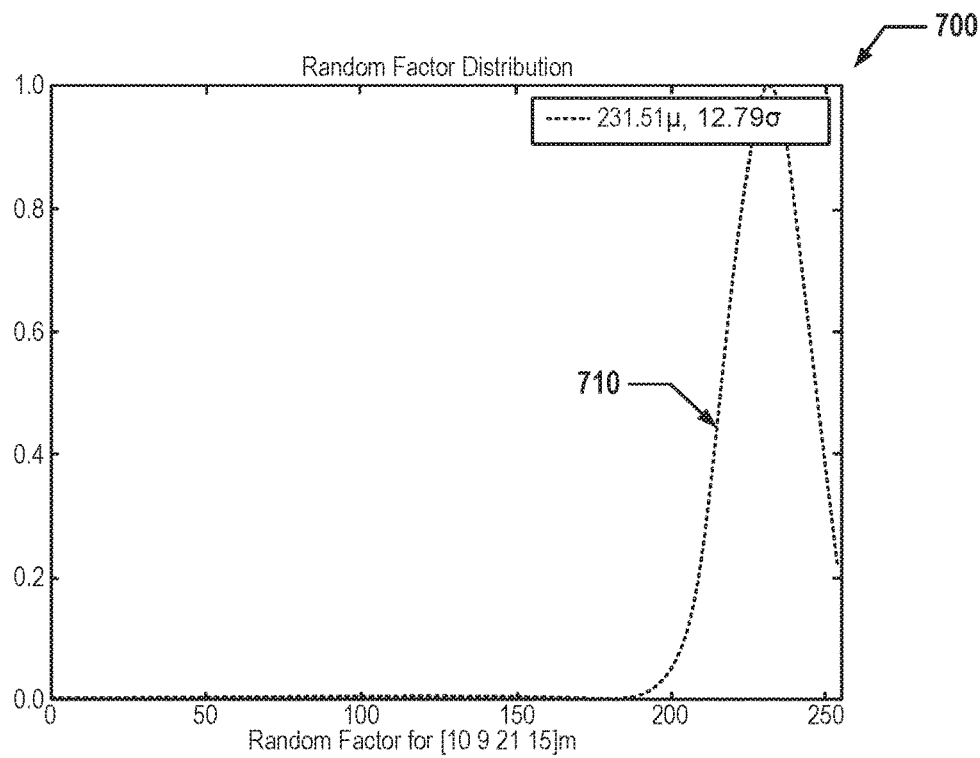
FIGS. 7A and 7B illustrate example graphs of probability distributions for two devices, according to one embodiment.
Figure 7B:
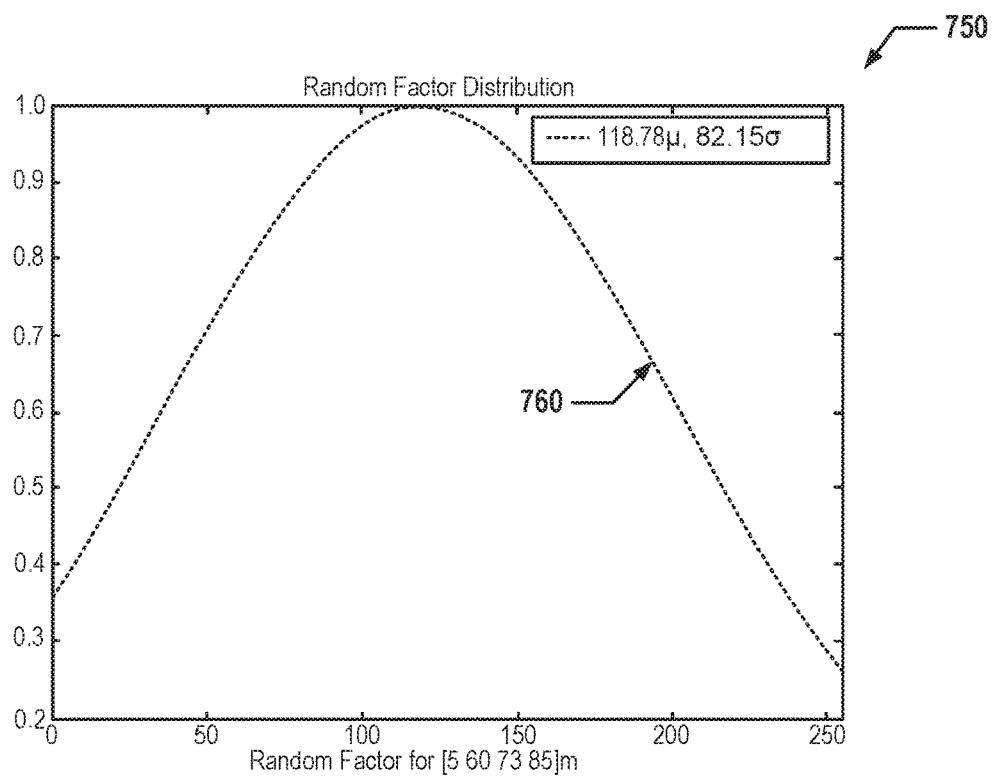

FIGS. 7A and 7B illustrate graphs 700 and 750 of probability distributions 710 and 760. In FIGS. 7A and 7B, the X-axis represents random factor values in the interval from 0 to 255 and the Y-axis represents the relative probability of the random factor values occurring or being selected. As an example, let all of the RTT measurements be in the interval from 5 meters to 100 meters and be mapped linearly to the interval from 0 to 255 meters. The mean and standard deviation of this new set of values are used to construct probability distributions 710 and 760 from which the random factor value 322 is randomly selected or drawn. Probability distribution 710 illustrates a PDF for a device with peers located at 10 meters, 9 meters, 21 meters and 15 meters. Probability distribution 760 illustrates a PDF for a device with peers located at 5 meters, 60 meters, 73 meters and 85 meters. The probability is higher that the random factor value 322 selected for the device corresponding to probability distribution 710 will be larger than the random factor value 322 selected for the device corresponding to probability distribution 760. The probability is also higher that the device corresponding to probability distribution 710 will be selected as a master NAN device as it is better positioned to become (i.e., assume the role of) the master NAN device.

Figure 8:
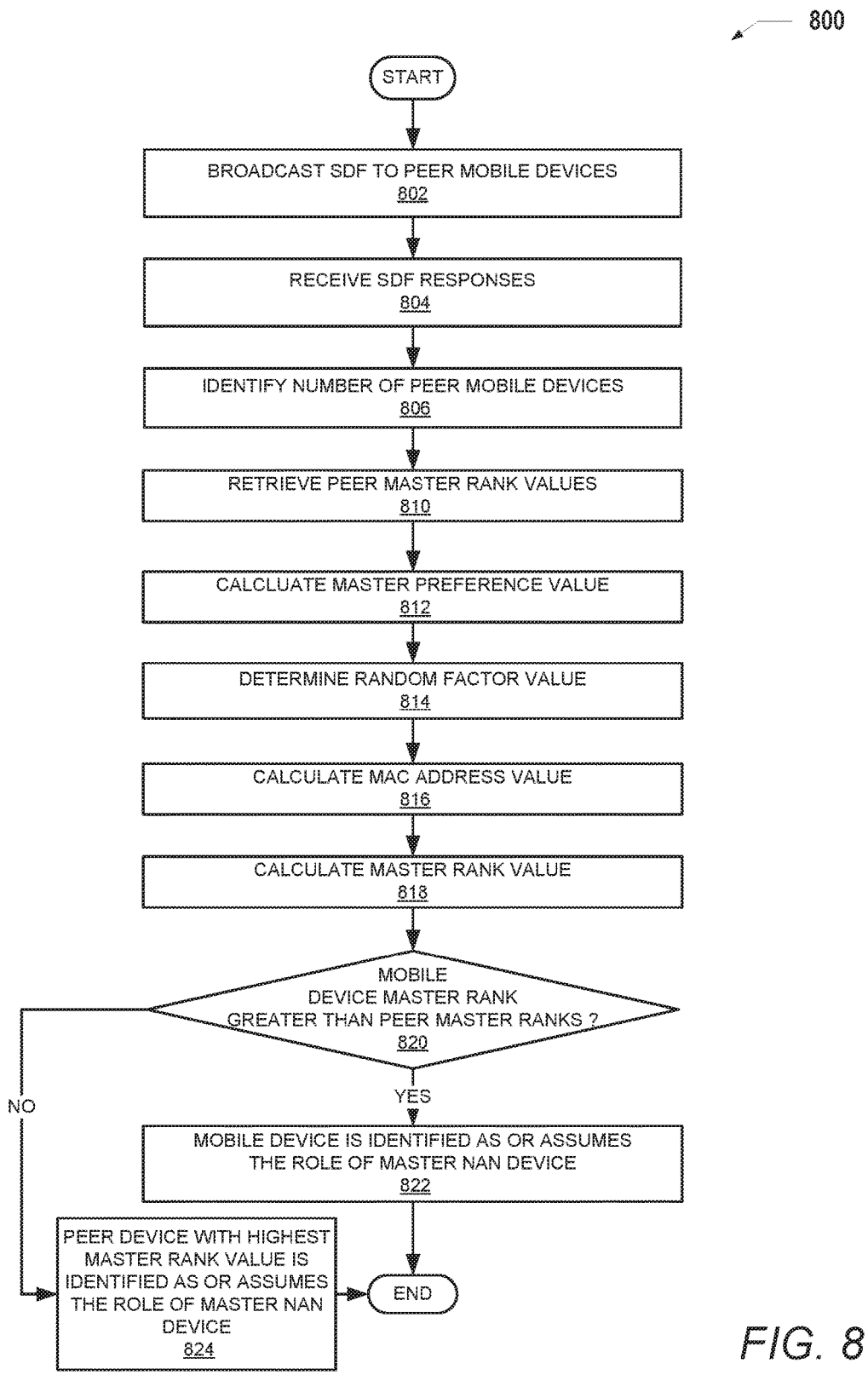
FIG. 8 provides a flowchart illustrating the method processes by which a device becomes the master NAN device for a NAN cluster, according to one embodiment.
Figure 9:
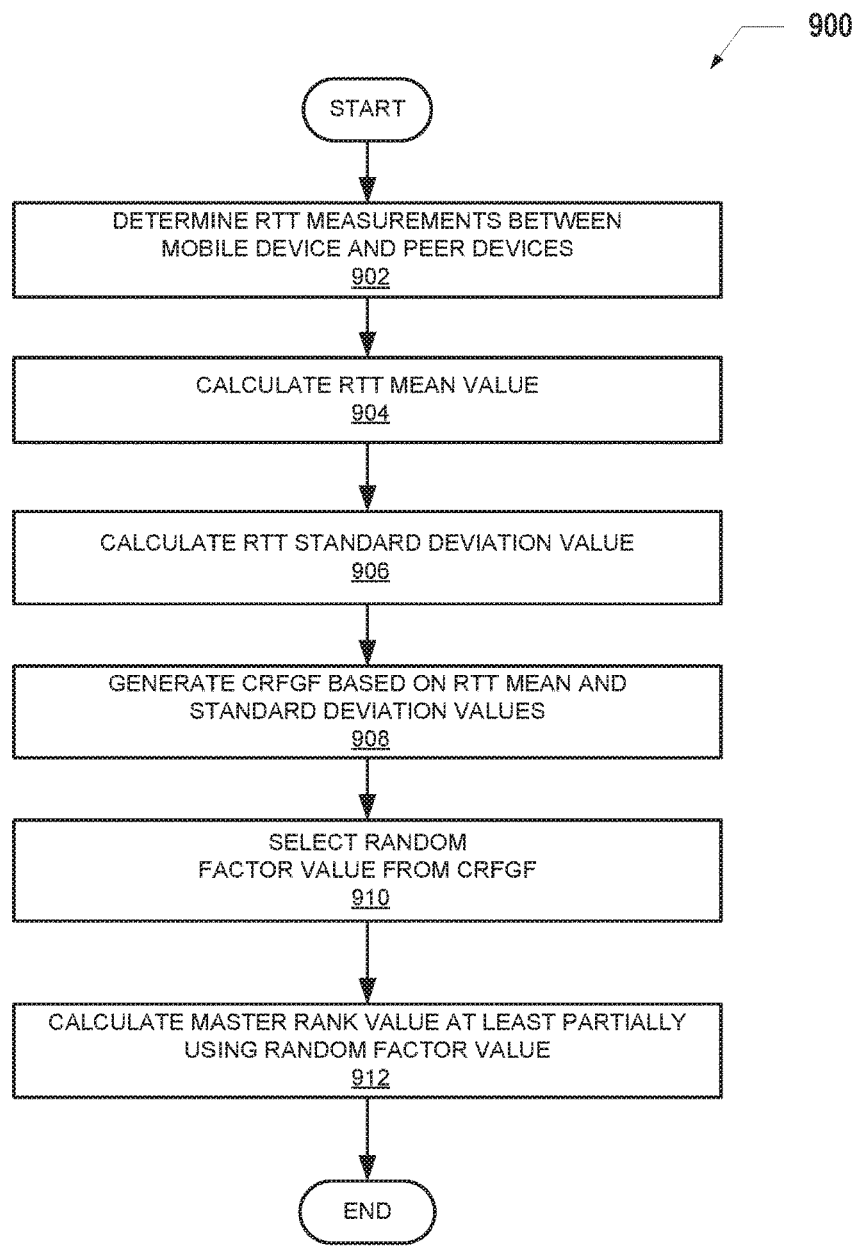
FIG. 9 provides a flowchart illustrating the method processes by which the device generates a random factor probability distribution function and selects a random factor value, according to one embodiment.
Figure 10:
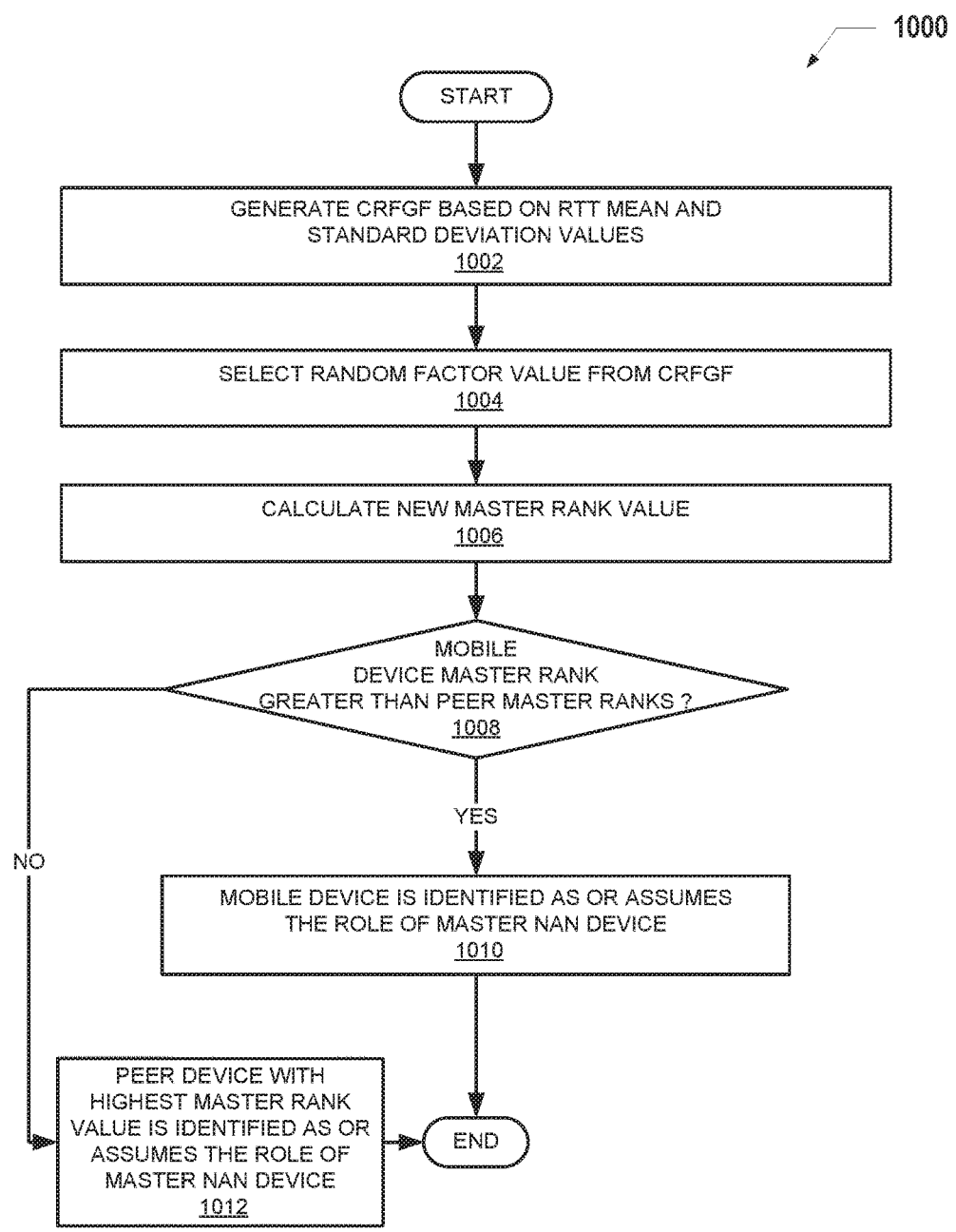
FIG. 10 provides a flowchart illustrating the method processes by which the device determines a master NAN device when the number of peer devices are equal for more than one device vying to be the master NAN device, according to one embodiment.

FIGS. 8-10 illustrate flowcharts of exemplary method processes for determining a master NAN device within NAN cluster 110. In the discussion of FIGS. 8-10, reference is made to elements described in FIGS. 1-7B.

FIG. 8 illustrates a flowchart of an exemplary method process by which device 120A determines if it is the master NAN device for NAN cluster 110, according to an illustrative embodiment. Method 800 can be implemented in device 120A via execution of code from NAN utility 215 by data processor 204 of processor IC 202 and specifically by execution of code from device detection module 350 and master rank module 352. As shown in FIG. 2, software instructions and code to execute method 800 can be stored on memory 210 for execution by data processor 204 of processor IC 202, with communication aspects supported by or performed in conjunction with DSP 206.

The method of FIG. 8 begins at block 802. Device 120A broadcasts an SDF 310, via Wi-Fi transceiver 239, to peer devices 120B-D that are within the communication range of device 120A. Device 120A receives the corresponding received SDF responses 312, via Wi-Fi transceiver 239, from peer devices 120B-D (block 804). Data processor 204 identifies the number of peer devices 314 from the received SDF responses 312 (block 806). The peer devices are located within a first communication range of device 120A.

At block 810, data processor 204 retrieves from each SDF response a master rank value associated with a corresponding peer device that issued the SDF response, and data processor 204 stores the master rank values to MRV table 315. Data processor 204 calculates a master preference value 318 for device 120A, at least partially based on the number of responding peer devices 314 (block 812). In one embodiment, the master preference value 318 can be equal to the sum of the master preference constant 316 and the count of the number of peer devices 314. Data processor 204 randomly selects a random factor value 322 from (CRFGF) 320 (block 814). In one embodiment, random factor value 322 can be drawn from a normal or log-normal distribution. At block 816, data processor 204 retrieves a MAC address value 324 of device 120A.

At block 818, data processor 204, calculates calculated master rank value 326 for device 120A using equation (1) based on the number of responding peer devices 314, the random factor value 322, and the MAC address value 324. Data processor 204 compares the calculated master rank value 326 with the received master rank values 315 (from MRV Table) of the responding peer devices (decision block 820). In response to the calculated master rank value 326 being greater than each of the received master rank values 315, device 120A becomes the master device within a NAN cluster that comprises the device and the responding peer devices (block 822). Method 800 then ends.

In response to the master rank value 326 not being greater than each of the received master rank values 315, device 120A accepts the peer device that beaconed the highest master rank value as the master device 328 within the NAN cluster (block 824). Method 800 then terminates.

FIG. 9 illustrates a flowchart of an exemplary method process by which device 120A configures a random factor generator function based on the signal quality measurements, such as the mean RTT value and the standard deviation RTT value, and selects a random factor value, according to an illustrative embodiment. Method 900 can be implemented in device 120A via data processor 204 execution of code from NAN utility 215 and specifically by execution of code from master rank module 352 and random factor generation module 354.

The method of FIG. 9 begins at block 902. Data processor 204 determines the signal quality measurements such as RTT measurements 332 between the device 120A and the peer devices 120B-D. In other embodiments, the signal quality measurements can include measurements based on signal strength or link quality. Device 120A can measure the RTT for a wireless signal to travel from device 120A to each of the peer devices 120B-D and return and save these times as RTT measurements 332. Data processor 204 calculates a mean RTT value 334 of the RTT measurements 332 (block 904). Data processor 204 calculates a standard deviation RTT value 336 of the RTT measurements 332 (block 906).

Data processor 204 configures CRFGF 320 based on the mean RTT value 334 and the standard deviation RTT value 336 (block 908). Data processor 204 generates a random factor value 322 using CRFGF 320 (block 910). Data processor 204 calculates the master rank value 326 for device 120A, at least partially based on the random factor value 322 (block 912). Method 900 then ends.

FIG. 10 illustrates a flowchart of an exemplary method process by which device 120A determines a master NAN device when two or more devices competing to be the master NAN device have the same number of peer devices, according to an illustrative embodiment. Method 1000 can be implemented in device 120A via data processor 204 execution of code from NAN utility 215 and specifically by execution of code from master rank module 352 and random factor generation module 354.

The method of FIG. 10 begins at the start block and proceeds to block 1002. Data processor 204 generates CRFGF 328 based on mean RTT value 324 and standard deviation RTT value 326 (block 1002). The mean RTT value 324 and standard deviation RTT value 326 are calculated based on RTT measurements 332 performed by device 120A. Data processor 204 randomly selects a random factor value 322 from CRFGF 328 (block 1004). Data processor 204 calculates the new master rank value 326 for device 120A, at least partially based on the random factor value 322 (block 1006).

Data processor 204 compares the new master rank value 326 for device 120A with the received master rank values 315, including the master rank values of the other devices vying to be the master NAN device (decision block 1008). In response to the calculated master rank value 326 for device 120A being greater than each of the received master rank values 315, device 120A becomes (i.e., is identified as or assumes the role of) the master NAN device 328 within NAN cluster 110 (block 1010). Method 1000 then ends.

In response to the master rank value 326 not being greater than each of the received master rank values 315, the peer device with the highest master rank value becomes the master NAN device (block 1012). Method 1000 then terminates.

As will be appreciated by one skilled in the art, aspects of the present invention may be embodied as a system, or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   transmitting, via a transceiver of a first device, a service discovery frame (SDF) that enables discovery of one or more peer devices within a neighborhood aware network (NAN);
   receiving, via the transceiver of the first device, SDF responses communicated from a number of peer devices located within a first communication range of the first device, the number of peer devices communicating with the first device via the NAN;
   identifying a count of the number of responding peer devices that are within the first communication range and have provided a response that is received by the first device;
   retrieving, from each SDF response, a master rank value associated with a corresponding peer device that issued the SDF response;
   calculating, via a processor of the first device, a first master rank value for the first device, the calculated first master rank value being at least partially based on a master preference value and at least partially based on a random factor value, the calculating comprising:
      calculating the master preference value as a sum of a master preference constant and the number of responding peer devices, wherein the master preference value is a dominant term within the calculation of the master rank value such that a device having a higher number of responses received from visible peer devices receives a master rank value that is greater than other peer devices that receive a lower number of responses from visible peer devices;

selecting the random factor value from among random factor values generated based on signal quality measurements associated with the received responses from the responding peer devices; and adding the random factor value to the master preference value, wherein when a second device has a same number of responding peer devices resulting in a same master preference value as the first device, and both the first device and the second device have a highest master preference value, the random factor value enables selection, as the master device, the device from among the first device and the second device having better signal quality measurements from its visible peer devices;

assigning the first master rank value to the first device;

comparing the first master rank value with the retrieved master rank values for each of the responding peer devices; and in response to the calculated first master rank value being greater than each of the retrieved master rank values, identifying the first device as a master device within a NAN cluster that comprises the first device and the responding peer devices, and enabling the first device to perform a role of the master device within the NAN cluster.

2. The method of claim 1, wherein the master preference value comprises a sum of a NAN master variable and the count of responding peer devices and calculating the master rank value comprises multiplying the master preference value by a second constant.

3. The method of claim 1, further comprising:
setting a value of at least one bit of a first master rank byte, based on at least the number of responding peer devices and the random factor value selected from a random factor probability distribution function, wherein the at least one bit indicates how suitable the first device is to serve as the master device within the NAN cluster.

4. The method of claim 1, wherein the selecting of the random factor value further comprises:
generating a random factor probability distribution function based at least partially on the signal quality measurements between the first device and each of the peer devices; and
randomly selecting the random factor value from the random factor probability distribution function.

5. The method of claim 4, wherein generating the random factor probability distribution function further comprises:
measuring, as the signal quality measurements, a round trip time (RTT) for a signal to travel between the first device and each of the responding peer devices;
calculating a mean RTT value of the RTT measurements between the first device and the responding peer devices;
calculating a standard deviation RTT value of the RTT measurements; and
generating the random factor probability distribution function based on the mean RTT value and the standard deviation RTT value.

6. The method of claim 1, further comprising:
determining, as the signal quality measurements, round trip time (RTT) measurements for a signal to travel between the first device and each of the responding peer devices;
generating a random factor probability distribution function based on a mean RTT value and a standard deviation RTT value; and randomly selecting the random factor value from the random factor probability distribution function.

7. The method of claim 1, wherein the master preference value is provided via a most significant byte of master rank bytes, and the method further comprises:
setting a most significant bit of the most significant byte to a value that indicates that the first device wants to serve as a master NAN device;
setting a remaining seven (7) least significant bits of the most significant byte to a second value representing the number of visible peer devices;
storing the master preference value to memory; and
storing the master rank value, calculated in part based on the master preference value, to memory.

8. The method of claim 7, further comprising:
locally generating a table based on information contained within the received SDF responses, the table being stored in a memory of the device;
storing the master rank value retrieved from each received SDF response in the table;
storing the calculated master rank value of the first device within the table; and
including within the table an indication of which peer device is a current master NAN device.

9. The method of claim 1, wherein the signal quality measurements are based on one of signal strength or link quality.

10. A device comprising:
a wireless communication device that enables wireless connection to and communication with other devices;
a memory having a utility located therein that determines a master rank for the device in a neighborhood aware network (NAN) comprising at least one peer device; and
a processor that is communicatively coupled to the wireless communication device and the memory and which executes the utility, wherein the utility further comprises:
a device detection module that executes on the processor to cause the device to:
transmit, via the wireless communication device, a service discovery frame (SDF) that enables discovery of one or more peer devices within a neighborhood aware network (NAN);
receive, via the wireless communication device, SDF responses communicated from a number of peer devices located within a first communication range of the first device, the number of peer devices communicating with the first device via the NAN;
identify a count of the number of responding peer devices that are within the first communication range and have provided a response that is received by the first device; and
retrieve from each SDF response a master rank value associated with a corresponding peer device that issued the response; and
a master rank module that executes on the processor to cause the device to:
calculate a first master rank value for the first device, the calculated first master rank value being at least partially based on a master preference value and at least partially based on a random factor value, the calculating comprising:
calculate the master preference value as a sum of a master preference constant and the number of responding peer devices, wherein the master preference value is a dominant term within the calculation of the master rank value such that a device having a higher number of responses received from visible peer devices receives a master rank value that is greater than other peer devices that receive a lower number of responses from visible peer devices;

select the random factor value from among random factor values generated based on signal quality measurements associated with the received responses from the responding peer devices; and add the random factor value to the master preference value, wherein when a second device has a same number of responding peer devices resulting in a same master preference value as the first device, and both the first device and the second device have a highest master preference value, the random factor value enables selection, as the master device, the device from among the first device and the second device having better signal quality measurements from its visible peer devices;

assign the first master rank value to the first device;

compare the first master rank value with the retrieved master rank values for each of the responding peer devices; and in response to the first master rank value being greater than each of the retrieved master rank values, identify the first device as a master device within a NAN cluster that comprises the first device and the responding peer devices, and perform, by the first device, a role of the master device within the NAN cluster.

11. The device of claim 10, wherein: the master preference value comprises one of: (a) a sum of a constant and the number of peer devices; and (b) a sum of a NAN master variable and the number of peer devices; and in calculating the master rank value, the utility causes the processor to multiply the master preference value by a second constant.

12. The device of claim 11, wherein the random factor generation module causes the processor to:
determine, as the signal quality measurements, round trip time (RTT) measurements for a signal to travel between the first device and each of the responding peer devices;
calculate a mean RTT value of the RTT measurements between the first device and the peer devices;
calculate a standard deviation RTT value of the RTT measurements between the first device and the peer devices; and
generate the random factor probability distribution function based on the mean RTT value and the standard deviation RTT value.

13. The device of claim 10, wherein the utility further comprises a random factor generation module that executes on the processor to cause the processor to:
generate a random factor probability distribution function based at least partially on the signal quality measurements between the first device and each of the peer devices; and
select the random factor value from the random factor probability distribution function.

14. The device of claim 10, wherein the utility further comprises a random factor generation module that executes on the processor to cause the processor to:
determine, as the signal quality measurements, round trip time (RTT) measurements for a signal to travel between the first device and each of the responding peer devices;
generate a random factor probability distribution function based on a mean RTT value and a standard deviation RTT value; and
select the random factor value from the random factor probability distribution function.

15. The device of claim 10, wherein the master preference value is provided via a most significant byte of master rank bytes, and the master rank module configures the processor to:
set a most significant bit of the most significant byte to a value that indicates that the first device wants to serve as a master NAN device;
set a remaining seven (7) least significant bits of the most significant byte to a second value representing the number of visible peer devices;
store the master preference value to memory; and
store the master rank value, calculated in part based on the master preference value, to memory.

16. A computer program product comprising:
a computer readable storage medium; and
program code on the computer readable storage medium that when executed by a processor, the program code causes the processor to implement the functionality of:
transmitting, via a transceiver of a first device, a service discovery frame (SDF) that enables discovery of one or more peer devices within a neighborhood aware network (NAN);
receiving, via the transceiver of the first device, SDF responses communicated from a number of peer devices located within a first communication range of the first device, the number of peer devices communicating with the first device via the NAN;
identifying, a count of the number of responding peer devices that are within the first communication range and have provided a response that is received by the first device;
retrieving, from each SDF response, a master rank value associated with a corresponding peer device that issued the response;
calculating a first master rank value for the first device, the calculated first master rank value being at least partially based on a master preference value and at least partially based on a random factor value, the calculating comprising:
calculating the master preference value as a sum of a master preference constant and the number of responding peer devices, wherein the master preference value is a dominant term within the calculation of the master rank value such that a device having a higher number of responses received from visible peer devices receives a master rank value that is greater than other peer devices that receive a lower number of responses from visible peer devices;
selecting the random factor value from among random factor values generated based on signal quality measurements associated with the received responses from the responding peer devices; and
adding the random factor value to the master preference value, wherein when a second device has a same number of responding peer devices resulting in a same master preference value as the first device, and both the first device and the second device have a highest master preference value, the random factor value enables selection, as the master device, the device from among the first device and the second device having better signal quality measurements from its visible peer devices;

assigning the first master rank value to the first device;

comparing the first master rank value with the retrieved master rank values for each of the responding peer devices; and in response to the first master rank value being greater than each of the retrieved master rank values, identifying the first device as a master device within a NAN cluster that comprises the first device and the responding peer devices, and performing, by the first device, a role of the master device within the NAN cluster.

17. The computer program product of claim 16, further comprising code for a random factor generation module that executes on the processor to provide the functionality of:

generating a random factor probability distribution function based at least partially on the signal quality measurements between the first device and each of the peer devices; and randomly selecting the random factor value from the random factor probability distribution function.

18. The computer program product of claim 17, wherein the random factor generation module further comprises code that enables the processor to provide the functionality of:

determining, as the signal quality measurements, round trip time (RTT) measurements for a signal to travel between the first device and each of the responding peer devices;

calculating a mean RTT value of the RTT measurements between the first device and the peer devices;

calculating a standard deviation RTT value of the RTT measurements between the first device and the peer devices; and generating the random factor probability distribution function based on the mean RTT value and the standard deviation RTT value.

19. The computer program product of claim 16, further comprising code for a random factor generation module that executes on the processor to provide the functionality of:

determining, as the signal quality measurements, round trip time (RTT) measurements for a signal to travel between the first device and each of the responding peer devices;

generating a random factor probability distribution function based on a mean RTT value and a standard deviation RTT value; and randomly selecting the random factor value from the random factor probability distribution function.

20. The computer program product of claim 16, wherein the master preference value is provided via a most significant byte of master rank bytes, and the program code further causes the processor to provide the functionality of:

setting a most significant bit of the most significant byte to a value that indicates that the first device wants to serve as a master NAN device;

setting a remaining seven (7) least significant bits of the most significant byte to a second value representing the number of visible peer devices;

storing the master preference value to memory; and storing the master rank value, calculated in part based on the master preference value, to memory.

* * * * *